UNITED STATES PATENT OFFICE.

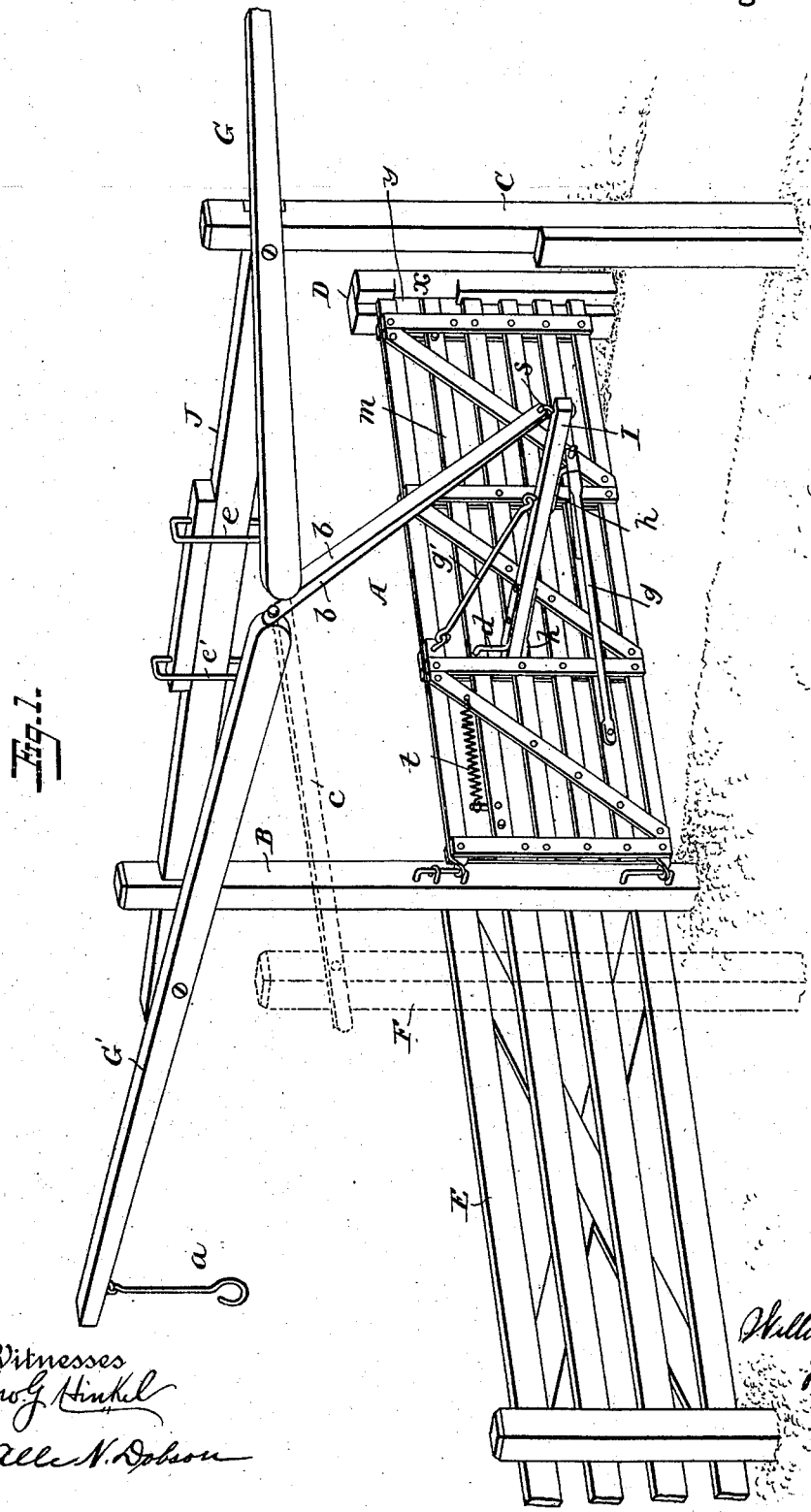

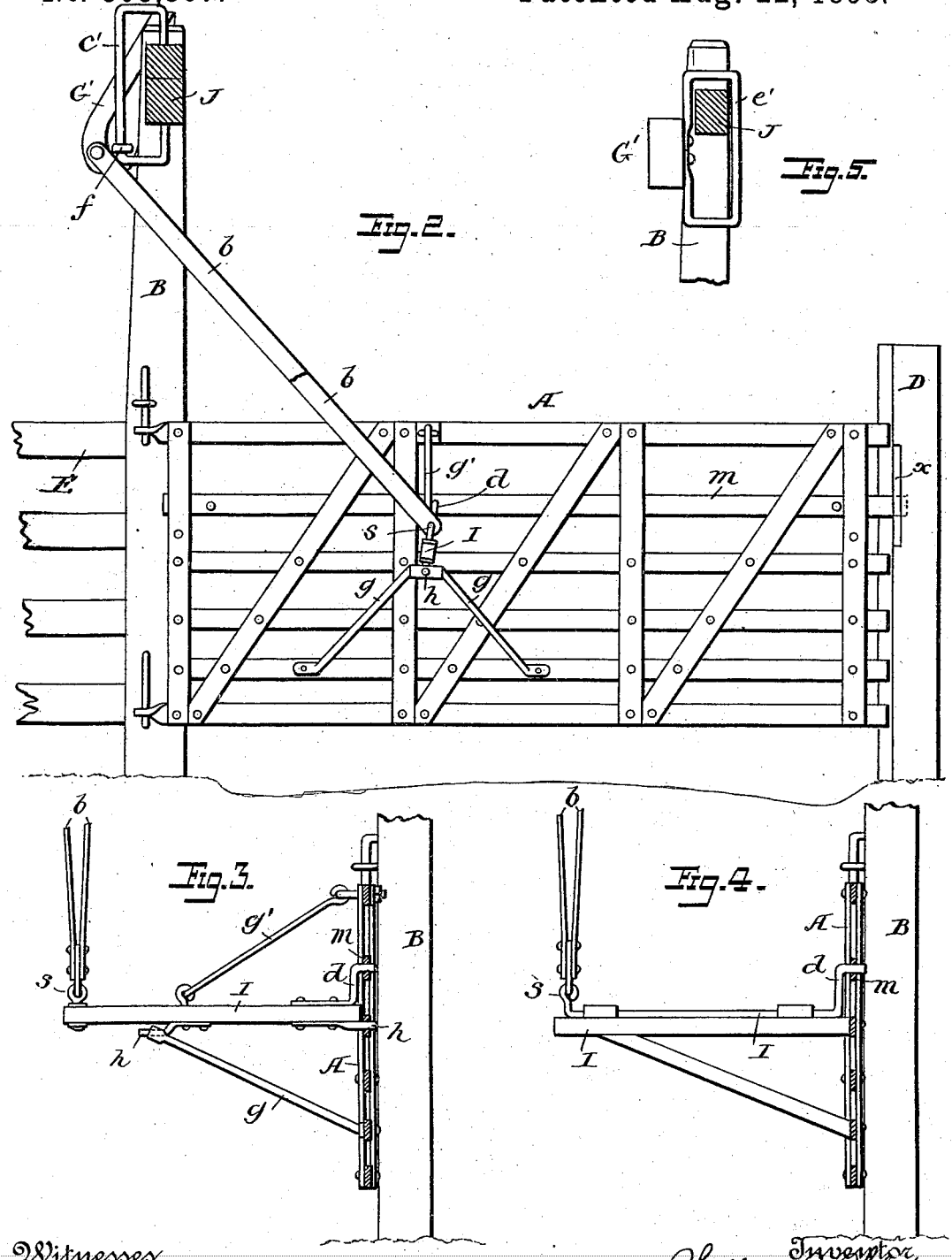

WILLIAM RICHARD WHITE, OF BLOOMINGTON, ILLINOIS.

SWINGING GATE.

SPECIFICATION forming part of Letters Patent No. 503,887, dated August 22, 1893.

Application filed May 24, 1892. Serial No. 434,136. (No model.)

*To all whom it may concern:*

Be it known that I, WILLIAM RICHARD WHITE, a citizen of the United States, residing at Bloomington, McLean county, State of Illinois, have invented certain new and useful Improvements in Swinging Gates, of which the following is a specification.

My invention relates to means for operating swinging gates and for locking and unlocking the same; and my invention consists in the combination with a swinging gate of an arm projecting from one side and connected with operating levers, and means whereby the rocking of the arm may be made the means of shoving the bolt or latch, substantially as set forth hereinafter and as illustrated in the accompanying drawings, in which—

Figure 1 is a perspective view of my improved gate. Fig. 2 is a view showing the side of the gate when closed. Fig. 3 is a transverse section of the gate and part of the operating appliances. Figs. 4 and 5 are sectional views illustrating modifications.

A, is the swinging panel of a gate hinged to an upright post B, to swing to the post D, to close the road, and to the post C, to open the road as usual, the gate when closed being in line with the fence E.

The gate is operated from the road-way by means of pendent handles or grasping pendants $a$, secured to the ends of levers G, G′, which are connected to the gate through the medium of connecting rods or bars, connected to an arm I of a frame extending laterally, preferably at right angles from the gate so that the lower ends of the rods or bars $b$, where they are connected to the gate or arm will swing to one side of the plane of the post B when the gate is open and to the opposite when the gate is closed. By this means the inner ends of the levers G, G′ which are both situated on the same side of the gate, will be in their lowest position when the gate is closed as well as when the gate is open, whereby a short downward pull upon either pendant $a$, and then releasing it will cause the gate to be shifted from one position to the other. By thus connecting the bars $b$, to a frame projecting from one side of the gate I am enabled to swing the gate through the quarter of a circle and without the necessity of carrying the outward end of the frame beyond a quarter of a circle for the purpose of securing the requisite leverage for opening and closing. If desired the inner ends of the levers G, G′, may be guided by means of connecting bars $c$, dotted lines Fig. 1, extending from the ends of said levers to a vertical post F, but I prefer instead of this to make use of guide rods $e$, $e'$, arranged to extend through eyes $f$, upon the inner ends of the levers and occupying vertical positions supported preferably by a cross-bar J, extending between the posts B, C, and holding the levers in proper position without interfering with their free up and down movements.

The above connections of the gate may serve as a means of automatically locking and unlocking the same. This is accomplished by connecting one member of the frame which extends at right angles from the gate, to a sliding bar or bolt $m$, in such manner that as the bar or bars $b$, pull upon such frame the said member will be moved to unlock the gate. In this case the arm I of the said projecting frame instead of being fixed and rigid is pivoted so as to rock upon its longitudinal axis and is connected with a sliding bar or bolt $m$, and has a short arm $s$, to which the bars $b$, $b$, are connected so that when the levers G, G′, are pulled upward the arm I, will be rocked in one direction and the bolt will be retracted and the gate swung open, and when the gate is swung shut, the momentum of the parts will tend to rock the arm I in the opposite direction and close the bolt. Or a spring $t$, may be used for closing the bolt in one direction. Different means of supporting the arm I, so as to rock, may be employed. For instance it is provided with two trunnions $h$, $h$, one of which extends through one of the bars of the gate, and the other through an opening in the meeting ends of two or more inclined braces $g$, $g$, and the bars $b$, are connected to an eye-bolt $s$, projecting from the arm I, while a longer crank-arm $d$, extending from the upper face of the arm I, at its opposite end, extends through an opening in the sliding bar or bolt $m$. The post D is provided with an inclined face $x$, which acts upon the end of the bolt $m$, to push it back, and has a recess $y$ into which the end of the bolt enters when the gate is closed. The rocking arm I may consist of a rod bent as shown in Fig. 4, and turning in bearings upon a fixed arm or bracket I'. The guide for the inner end of the lever G or G', instead of being a fixed rod e as shown in Figs. 1 and 2, may be in the form of a strap e', fastened to the lever and extending around the cross-bar J as shown in Fig. 5, or it may be a pivoted rod as shown in dotted lines. A brace g' supports the arm I when necessary.

Although I have shown an extended arm arranged to rock and move a sliding bar or latch it will be evident that said arm may have any other movements and connection with latches or bolts that slide or lift on the movement of said bar.

Without limiting myself to the precise construction and arrangement of parts shown, I claim—

1. The combination of a swinging gate, a lock or bolt therefor, the operating levers, G, G', the inner ends of both of which are at one side of the gate, when the gate is closed a rocking arm connected with the said lock or bolt and situated between the ends of the gate and projecting outward therefrom on that side on which are situated the inner ends of the operating levers and the connecting bar between the inner ends of the operating lever and the said rocking arm, substantially as set forth.

2. The combination of a swinging gate, a lock or bolt therefor, the operating levers, G, G', the inner ends of which are at one side of and at a distance from the side of the gate when it is closed—a rocking arm connected with the said lock or bolt and situated between the ends of the gate and projecting outward, substantially horizontally from the side of the gate and arranged to rock on an axis in line with the length of the said arm, and the connecting bars between the inner ends of the levers and the said rocking arm whereby the gate may be unlocked and opened by a simple downward pull upon either of the levers, and whereby it may be closed by a simple downward pull upon either of the levers—substantially as set forth.

3. The combination of a swinging gate, operating levers, connecting bars, the horizontal rocking arm I, braces g, g, and g' constituting a frame for supporting the rocking arm; and a sliding bolt connected with the rocking arm, substantially as set forth.

4. The combination with the operating levers G, G', of guides for guiding the inner ends of the said levers, consisting of the vertically disposed guide rods e, e', and the eyes f which engage therewith substantially as set forth.

5. The combination of a swinging gate provided with a lock or latch, and with a movable arm connected directly with the lock or latch and projecting laterally from the side of the gate between its ends, the operating lever, the inner end or portion of which is at one side of the gate and under which the said movable arm swings as the gate is opened and closed, and a bar connected with the said movable arm and with the operating lever, substantially as set forth.

In testimony whereof I have signed my name to this specification in the presence of two subscribing witnesses.

WILLIAM RICHARD WHITE.

Witnesses:
MATTIE J. WHITE,
BESSIE L. WHITE.